United States Patent
Hiernard et al.

(10) Patent No.: US 7,475,919 B2
(45) Date of Patent: Jan. 13, 2009

(54) SLOTTED PIPE CLAMP WITH OPPOSED FLANGE ENGAGEMENT LOOPS

(75) Inventors: Bruno Hiernard, Charlton (GB); Brian T. Ignaczak, Rochester, MI (US)

(73) Assignee: Breeze-Torca Products, LLC, Auburn Hills, MI (US)

( * ) Notice: Subject to any disclaimer, the term of this patent is extended or adjusted under 35 U.S.C. 154(b) by 0 days.

(21) Appl. No.: 11/057,675

(22) Filed: Feb. 14, 2005

(65) Prior Publication Data

US 2006/0192385 A1 Aug. 31, 2006

Related U.S. Application Data

(60) Provisional application No. 60/544,936, filed on Feb. 13, 2004.

(51) Int. Cl.
  *F16L 21/00* (2006.01)
(52) U.S. Cl. .................. 285/419; 285/420; 285/373
(58) Field of Classification Search .................. 285/419, 285/420, 373
  See application file for complete search history.

(56) References Cited

U.S. PATENT DOCUMENTS

| | | | |
|---|---|---|---|
| 2,874,440 A | 2/1959 | Kalilkow et al. | |
| 3,004,781 A * | 10/1961 | Morris | 285/369 |
| 4,045,060 A * | 8/1977 | Daigle | 285/373 |
| 4,049,298 A | 9/1977 | Foti | |
| 4,056,273 A | 11/1977 | Cassel | |
| 4,261,600 A | 4/1981 | Cassel | |
| 4,312,526 A | 1/1982 | Cassel | |
| 4,365,393 A | 12/1982 | Hauffe et al. | |
| 4,463,975 A * | 8/1984 | McCord | 285/419 |
| 4,473,246 A | 9/1984 | McDowell | |
| 4,502,189 A * | 3/1985 | Sieberkrob et al. | 285/373 |
| 4,623,164 A | 11/1986 | Cassel et al. | |
| 4,629,226 A | 12/1986 | Cassel et al. | |
| 4,660,862 A | 4/1987 | Cassel et al. | |
| 4,813,718 A | 3/1989 | Matter et al. | |
| 4,813,720 A | 3/1989 | Cassel | |
| 5,010,626 A | 4/1991 | Dominguez | |
| 5,588,680 A | 12/1996 | Cassel et al. | |
| 5,632,513 A | 5/1997 | Cassel | |
| 6,089,624 A | 7/2000 | Cassel et al. | |
| 6,199,921 B1 | 3/2001 | Cassel et al. | |
| 6,269,524 B1 | 8/2001 | Cassel | |
| 6,435,565 B2 | 8/2002 | Potts et al. | |
| 6,490,765 B2 | 12/2002 | Anthes et al. | |
| 6,519,815 B2 | 2/2003 | Cassel et al. | |

(Continued)

*Primary Examiner*—Aaron M Dunwoody
(74) *Attorney, Agent, or Firm*—Reising, Ethington, Barnes, Kisselle, P.C.

(57) ABSTRACT

A pipe clamp which includes an open band of metal, a pair of opposed flanges located at the open ends of the band, and a tightening mechanism for drawing the flanges together. Each flange extends radially from a body portion of the band to a loop formed by a portion of the band material folded back onto itself. The flanges each have an aperture at a location intermediate the loop and the body portion to accept a fastener for tightening of the band. The loops are disposed adjacent each other such that the flanges are separated by a gap that is greater at the apertures than at the loops. One or both of the flanges can have a slot that extends into the body portion of the band so that the slotted flange comprises two flange portions that can be tightened somewhat independently of each other.

24 Claims, 3 Drawing Sheets

U.S. PATENT DOCUMENTS 6,634,607 B2 * 10/2003 Vogel et al. ................ 248/74.3
6,758,501 B2    7/2004 Amedure et al.
6,877,780 B2    4/2005 Potts et al.
2002/0014772 A1  2/2002 Amedure et al.
2003/0015872 A1  1/2003 Potts et al.

* cited by examiner

SLOTTED PIPE CLAMP WITH OPPOSED FLANGE ENGAGEMENT LOOPS

CROSS-REFERENCE TO RELATED APPLICATION

This application claims the priority of U.S. application Ser. No. 60/544,936, filed Feb. 13, 2004, the complete disclosure of which is hereby incorporated by reference.

FIELD OF THE INVENTION

This invention relates generally to pipe clamps and, more specifically, to both band clamps and pipe couplers used for connecting pipes or other tubular members together either telescopically or in an end-to-end configuration.

BACKGROUND OF THE INVENTION

Vehicle exhaust systems typically include an assembly of tubes, or pipes, that provide transport of engine exhaust gases. Each individual pipe section is connected to another pipe section to form a complete exhaust system assembly. Such connections are usually either telescopic or as an end-to-end abutting connection. To be effective, the connection formed between these pipes should provide a suitable fluid-tight seal against exhaust gas leakage. The connection should also have a high degree of mechanical strength and be capable of being disassembled for possible maintenance and repair.

Pipe couplers are often used for exhaust systems where the pipe sections are axially joined in an end-to-end configuration. A conventional pipe coupler includes a band having a generally circular conformation and terminating in opposing connecting flanges. The flanges are joined together by a fastener, such as a bolt, with a reaction member provided therebetween. As the fastener is tightened, the flanges are drawn together against the reaction member to mechanically seal the pipe coupler over the ends of the pipes.

An advantage of the reaction member is that it helps provide an even distribution of circumferential forces on the pipes as the band is tightened. Also, the reaction member permits some flexibility for further tightening or loosening of the band to maintain a suitable fluid-tight seal. U.S. Patent Application Publication No. 2002/0014772 A1 published Feb. 7, 2002 is an example of such a pipe coupler having a reaction block, and the entire contents of that published application are hereby incorporated by reference.

Other pipe coupler designs exist that do not utilize any reaction member. For example, U.S. Pat. No. 4,473,246, issued to McDowell, provides a pipe coupler having a band terminating in opposing connecting flanges with no reaction member therebetween. The band and the flanges of this design are integrally formed by extrusion. The flanges have abutment surfaces that contact each other upon tightening of the band. One of the abutment surfaces is semi-circular in shape and the other is flat. Therefore, when the abutment surfaces contact each other, they produce a fulcrum about which the semi-circular abutment surface will rotate about the flat abutment surface, thereby providing effective tightening to impart tensioning of the band.

Thus, it is an object of the present invention to provide a pipe coupler to mechanically join pipes in an end-to-end connection with good sealing, but without the use of a reaction member in the pipe coupler design. It is a further object of the present invention to provide a pipe coupler that is economical, lighter, and easier to manufacture and overcomes the shortcomings of the prior art.

SUMMARY OF THE INVENTION

In accordance with one aspect of the invention, there is disclosed a pipe clamp which includes an open band of metal, a pair of opposed flanges located at the open ends of the band, and a tightening mechanism for drawing the flanges together, wherein each of the opposed flanges is formed from sheet material that extends radially from a body portion of the band to a loop formed by a portion of the sheet material folded back onto itself such that the flanges comprise a plurality of layers of the sheet material. The flanges each have an aperture through the sheet material at a location intermediate the loop and the body portion, with the loops being disposed adjacent each other such that the flanges are separated by a gap that is greater at the apertures than at the loops. The tightening mechanism can include at least one fastener that extends through the apertures in the opposed flanges. Tightening of the fastener draws the flanges together until the loops on the flanges engage each other and act as a fulcrum, with further tightening causing the lower end of the flanges to be drawn together during further tightening of the fastener.

In accordance with another embodiment of the invention, there is provided a pipe coupler that includes a band of metal having opposed flanges at its open ends, with at least one of the flanges having a slot that separates the flange into two flange portions and that extends into the body portion of the band and partially about the circumference of said band. The pipe coupler includes a tightening mechanism for drawing the two flanges together and includes a split sleeve located within the band to seal over the adjoining pipe ends when in use. The tightening mechanism includes at least two fasteners, each fastener being connected to the flanges for drawing one of the flange portions toward the opposing flange to enable tightening of each flange portion substantially independently of the tightening of the other flange portion. The split sleeve has a pair of mating ends that are separated by a gap, and the sleeve is oriented within the band so that the slot in the band does not overlie the gap in the sleeve.

DETAILED DESCRIPTION OF THE PREFERRED EMBODIMENTS

Referring now to the drawings, four illustrative embodiments of the invention are shown in the form of pipe couplers especially adapted for use in automotive engine exhaust systems. It will be appreciated as the description proceeds that the invention is useful in many different applications and in a wide variety of embodiments. For example, the invention can be used not only for pipe couplers that permit connecting pipes in an end-to-end configuration, but also for band clamps that are typically clamped over a pair of telescopically-connected pipes. Examples of band clamps with which the present invention is useful are disclosed in U.S. Patent Application Publication No. 2003/0015872 A1 published Jan. 23, 2003, the entire contents of which are hereby incorporated by reference. As used herein, the term "pipe clamp" is used to refer to both pipe couplers and band clamps. Furthermore, the terms axially, angularly, and radially refer to directions relative to the circular shape of the illustrated pipe couplers, so that the axial direction extends along the axis of this circular shape, radial directions extend radially away from this axis, and angularly refers to locations at points around the circumference of the pipe coupler.

Figure 1:
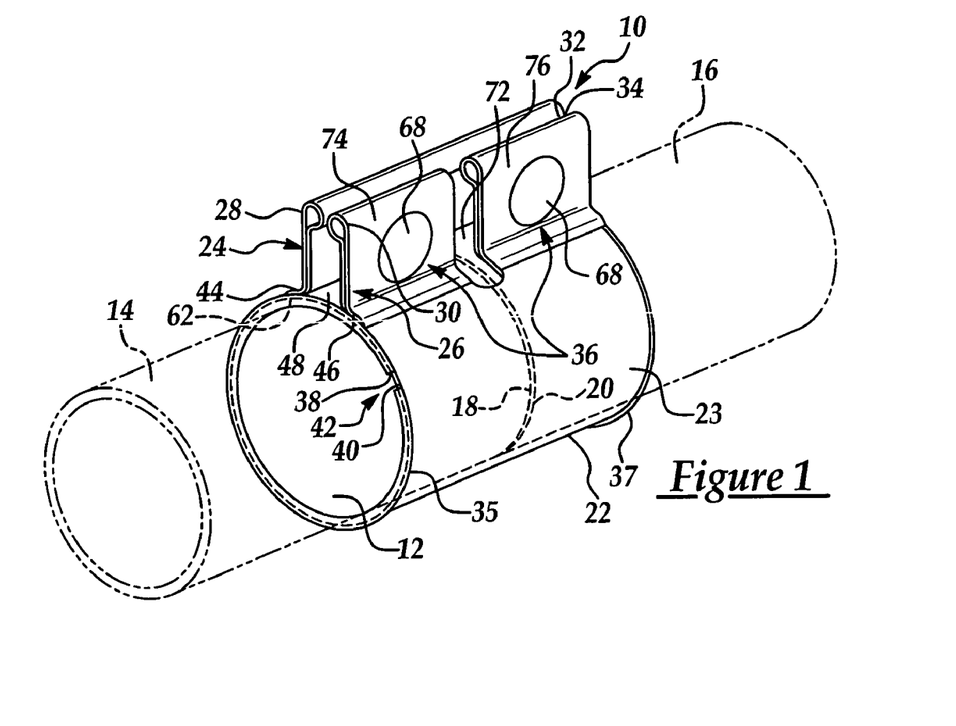
FIG. 1 is a perspective view of a first embodiment of a pipe coupler of the present invention showing an inward wrap direction of the sheet material forming the flanges.

A first embodiment of the present invention is shown in perspective view in FIG. 1. A coupler 10 comprises a split sealing sleeve 12 that encircles the axially aligned pipes 14, 16 at their respective ends 18, 20. Disposed outside of the split sealing sleeve 12 is an open band 22, which includes a cylindrical body portion 23 and terminates in opposing flanges 24, 26. The flanges 24, 26 extend from the body portion 23 to loops 28, 30 at the radially outward-most portion of the flanges. The loops 28, 30 include abutment surfaces 32, 34 which engage each other as the band 22 is tightened by a nut and bolt fastener or other tightening mechanism 36. The flanges 24, 26 are drawn together by tightening the fastener 36, which causes the band 22 to tighten as a result. As will be described below, the abutment surfaces 32, 34 of the loops engage early on in the tightening process and act as a fulcrum which causes the lower end of the flanges to be drawn together during further tightening of the fastener.

The pipes 14, 16 are generally made of galvanized steel or any other suitable material adapted for transporting pressurized fluid. The pipes 14, 16 are preferably automobile exhaust pipes, but can be other types of pipes or conduits used for transporting any fluid or solid (e.g., gas lines, pipelines, material handling, etc.) and can have either have similar or different cross-sectional sizes and can have any tubular geometric shape. For purposes of illustration, and as shown in FIG. 1, pipes 14, 16 are generally circular in cross section and have the same nominal outer diameter.

The split sealing sleeve 12 is located within the band 22 and can includes a pair of flared axial ends 35, 37 that extend radially outwardly such that the band 22 is captively held on the sleeve 12 between these two ends 35, 37. Sleeve 12 also has first and second circumferential ends 38, 40 which define an axially or longitudinally extending sleeve gap 42 located between them. This axial gap in the sleeve 12 can have a tongue and groove geometry (not shown) such as disclosed in the above-noted U.S. Patent Application Publication No. 2002/0014772 A1. The sleeve gap 42 is angularly offset relative to the band 22 so that the sleeve gap 42 does not overlap in open communication with an open band gap 48 defined between the flanges 24, 26. When the band 22 is tightened by the tightening mechanism 36, the sealing sleeve 12 closes, causing the circumferential ends 38, 40 to close together. Accordingly, the gap 42 closes and a suitable gas seal is formed between the ends 18, 20 of pipes 12, 14.

The band 22 surrounds sealing sleeve 12 and encircles the pipes 14, 16 at the pipe ends 18, 20. Band 22 is generally made of a sheet metal material (typically stainless or galvanized steel) with its cylindrical body 23 extending circumferentially slightly less than 360° from two opposing ends 44, 46 leaving band gap 48 between them. The band gap 48 defines the approximate circumferential distance that ends 44, 46 can travel as band 22 is tightened up to the point where the ends 44, 46 can come together and nearly touch one another.

Formed respectively on ends 44, 46 of band 22 are the flanges 24, 26, arranged in opposing relation to each other. Flanges 24, 26 are made of sheet metal material and are formed as unitary extensions of band 22 at ends 44, 46. Alternatively, one of both of the flanges can be made as separate components attached to the body portion 23 such as by welding. Flanges 24, 26 project perpendicularly from ends 44, 46 and extend radially outwardly from band body 23. The loops 28, 30 of these flanges are formed by folding the sheet material of the flanges 24, 26 back onto itself and leaving a somewhat cylindrical internal space at the fold. The wrapped sheet material creates the relatively flat, double-layered flanges 24, 26. The flatness of the flanges 24, 26, thereby eliminates the need for additional mechanical parts, such as a spacer bar between the flanges and the tightening mechanism. Various metal forming techniques that can be used to form the flanges, as well as the other different components of the illustrated embodiments, is well within the knowledge of those skilled in the art.

Figure 2:
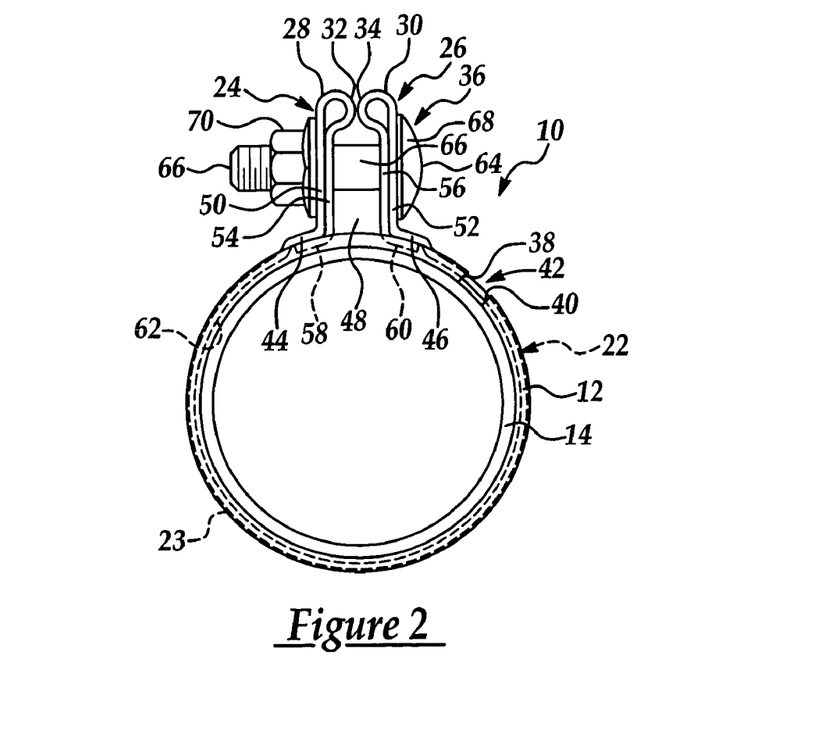
FIG. 2 is a side view of the pipe coupler of FIG. 1.

As better illustrated in FIG. 2, the sheet material of the flanges 24, 26 extends radially outwardly away from the ends 44, 46 of the cylindrical body 23 in the form of outer leg portions 50, 52. The sheet material of the flanges 24, 26 loops inwardly around from the outer leg portions 50, 52 to form the loops 28, 30. The inner leg portions 54, 56 extend radially inwardly from the loops 28, 30 along the outer leg portions 50, 52 and terminate in flange ends 58, 60. In other words, the loops 28, 30 are formed by folding the sheet material of the flanges 24, 26 in a wrap direction inward toward one another from outer legs 50, 52 of the flanges 24, 26. This is not to say that the flanges and loops are formed after the sheet material of the band 22 is formed into its circular conformation, but only that the wrap direction of the layers of the flanges is inward for this embodiment when viewed as a part of the finished product. The flange ends 58, 60 extend underneath the respective ends 44, 46 and terminate at a located underlying the body portion 23 of band 22. Thus, the sheet material doubles over at the inner surface 62 of the band 22 at the two ends 44, 46. The ends 58, 60 can be attached to band 22 by pinching, welding, or other suitable metal joining technique. The two layers of sheet material of the outer and inner leg portions 50, 52, 54, 56 are preferably fastened together with a mechanical joint, staking operation, or the like. Accordingly, the outer leg portions 50, 52 are relatively immovable with respect to inner leg portions 54, 56, thereby rigidifying the flanges 24, 26.

The two layers of sheet metal that make up each flange contact each other along an interface that extends radially outwardly toward its associated loop. The loops are each formed such that, when viewed from the axial end view of FIG. 2, a central region of each loop is angularly offset from the interface between the two layers of its associated flange. This offset for each loop is in the direction of the other loop so that the space between the abutment surfaces on the loops is less than the gap 48 between the flanges at other locations on the flanges. This mutually inward disposition of the two loops 28, 30 can be achieved by having the outer legs 50, 52 extend radially farther away from the body portion 23 of the band than does the inner legs 54, 56, such that the outer legs form a portion of their associated loop.

Referring again to FIG. 1, loops 28, 30 are generally situated in opposing relation to each other and are adapted for line contact along respective abutment surfaces 32, 34 upon drawing the ends 44, 46 of band 22 together. Specifically, loops 28, 30 are compressible and somewhat resilient so that they can at least partially revert back to their original configuration for subsequent re-tightening of band 22 after first loosening the band 22. Loops 28, 30 are generally circular in cross section and extend axially along the entire length of flanges 24, 26.

Apertures are provided through the flanges 24, 26 at desired locations along the axial length thereof. The apertures are adapted to receive the fasteners 36 at positions radially inward of the loops 28, 30. The fasteners 36 are used to draw the flanges 24, 26 together to thereby tighten band 22 around the sealing sleeve 12 and the pipes 14, 16. As shown in FIG. 1, the tightening mechanism 36 includes two fasteners each in the form of a nut and bolt.

The tightening mechanism 36 is better shown in FIG. 2. A bolt 64 includes a shank 66 which is passed through the aligned apertures in the two connecting flanges 24, 26 with a bolt head 68 seated on outer leg 52 of flange 26. A nut 70 is then threaded onto the protruding shank 66 of the bolt 64 until it is seated against outer leg 50 of the other flange 24. For purposes of the present invention, the nut and bolt tightening mechanism 36 can be situated in the reverse, where bolt head 68 is seated on the outer leg 50 of flange 24 and the nut 70 is seated on outer leg 52 of flange 26. Either arrangement will work so long as the design of the flanges 24, 26 is essentially the same. As shown, either the bolt head 68 or nut 70 or both, backs up against its associated loop 28, 30 so that the closing force during tightening of the fastener is applied directly to the loop.

As shown in FIG. 1, the coupler 10 also includes a slot 72 formed into either flange 24 or flange 26 and extends into a portion of band 22. The slot 72 permits joining pipes having different cross-sectional sizes, allows independent rundown of nuts using single spindle nut runners and, generally, allows two halves of the coupler 10 to act independently. For the bolt and nut tightening mechanism 36, the slot 72 is formed in the flange having the bolt head 68 seated thereon because the flange having the nut (not shown) has greater movement and deformation upon tightening. As better shown in FIG. 2, bolt head 68 is seated against outer leg 52 of flange 26. The slot 72, as shown in FIG. 1, is formed through the entire height of flange 26, where the bolt head 68 is seated thereon, thereby splitting flange 26 into two flange sections 74, 76, thereby warranting two fasteners 36 extending respectively therethrough. In general, the slot 72 allows the coupler to form a strong mechanical bond between the pipes 14, 16 to achieve a suitable fluid-tight seal.

In use, the pipes 14, 16 are joined in an end-to-end connection with pipe coupler 10 centered over the abutting pipe ends. Initially, the flanges are separated by the gap 48 with the abutment surfaces 32, 34 spaced slightly apart. Flanges 24, 26 are then drawn together upon tightening of the fasteners 36. As the flanges 24, 26 approach each other, the loops 28, 30 are the first to come into contact. Tightening of the fasteners 36 cause the band 22 to contract and exert circumferential and radial forces on the sleeve 12. In turn, the sleeve 12 contracts and clamps together the ends 18, 20 of the pipes 12, 14. Upon tightening of the band 22, the loops 28, 30 approach each other until the abutment surfaces 32, 34 touch. Depending on the materials and thickness used for the sheet material of the flange, further tightening can cause the loops to deform to accommodate opposing contact forces exerted thereon. The partial compressibility of the loops 28, 30 permits the band 22 to close around the sleeve 12 and pipes 14, 16 such that the ends 44, 46 practically, if not completely, touch without destroying the loops 28, 30 for subsequent use. Furthermore, the compressible loops 28, 30 absorb the impact forces of the band 22 closure so that the flanges 24, 26 remain relatively parallel with each other. This allows the flanges 24, 26 to stay in perpendicular relation to the ends 44, 46 throughout the entire coupling process. Specifically, as the tightening mechanisms 36 are tightened, increased circumferential tension is imparted to the band 22 as a result of the forces exerted on the flanges 24, 26. The loops 28, 30 contact each other at their respective abutment surfaces 32, 34, which together define a fulcrum, about which the flanges 24, 26 pivot or rock. Accordingly, the flanges 24, 26 are swingable toward each other, causing the band 22 to circumferentially tighten. In response to such swinging motion of the flanges 24, 26, little deformity of flanges 24, 26 occurs, which strengthens the mechanical bond between the pipes 14, 16 as well as creates a suitable fluid-tight seal. As a result, no reaction member is required in the coupler 10 of the present invention, which is commonly used in other pipe coupling systems.

Figure 3:
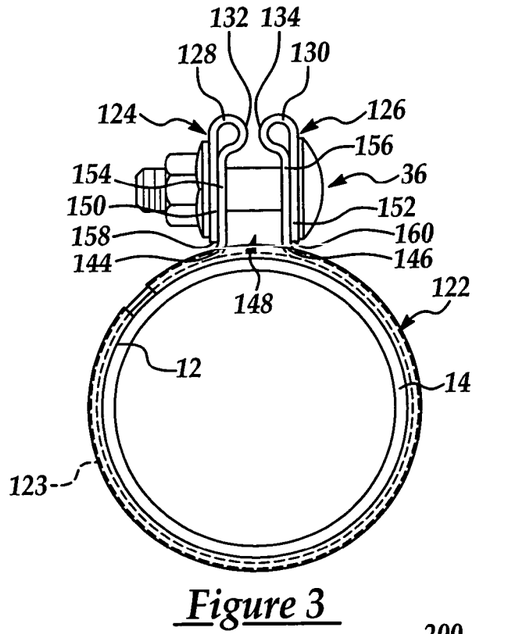
FIG. 3 is a side view of a second embodiment of a pipe coupler of the present invention showing an outward wrap direction of the sheet material forming the flanges.

A second embodiment of the invention is shown in FIG. 3, wherein a coupler 100 has basically the same construction and function as the coupler 10 of the first embodiment shown in FIGS. 1 and 2, with the exception of a different wrap direction of the sheet material used in forming loops 128, 130 on flanges 124, 126. The coupler 100 comprises a split sealing sleeve 12 that encircles the axially aligned pipes (only pipe 14 shown) at their respective ends. Disposed outside of the split sealing sleeve 12 is an open band 122, which is formed as a cylindrical body 123 and which terminates in opposing flanges 124, 126. The flanges 124, 126 have loops 128, 130 including abutment surfaces 132, 134, respectively, that define flange tips. The loops 128, 130 compress upon contact of abutment surfaces 132, 134 as the band 122 is tightened by the tightening mechanism 36. As with the first embodiment, the flanges 124, 126 are drawn together by tightening the fasteners 36, which causes the band 122 to tighten around the sealing sleeve 12 and pipes as a result.

The second embodiment shown in FIG. 3 demonstrates how the loops 128, 130 are formed using a different wrap direction than that of the first embodiment. In the second embodiment, the sheet material of the flanges 124, 126 extends radially outwardly away from the ends 144, 146 of the cylindrical body 123 in the form of inner leg portions 154, 156. The sheet material of the flanges 124, 126 loops outwardly around from the inner leg portions 154, 156 to form the loops 128, 130, which terminate at outer leg portions 150, 152. The outer leg portions 150, 152 extend radially inwardly from the loops 128, 130 along the inner leg portions 154, 156 and terminate in flange ends 158, 160. In other words, the loops 128, 130 are formed by folding the sheet material of the flanges 124, 126 in a wrap direction outward away from one another from inner legs 154, 156 of the flanges 124, 126. The sheet material of the outer and inner leg portions 150, 152, 154, 156 are preferably fastened together with a toggle lock, staking operation, or the like. Accordingly, the outer leg portions 150, 152 are relatively immovable with respect to inner leg portions 154, 156, thereby rigidifying the flanges 124, 126.

The mechanical sealing effect of the second embodiment is largely the same as that of the first embodiment. Either wrap direction will permit a suitable joint to be formed between the axially arranged pipes. However, in this embodiment, the flange ends 158, 160 of the two layers of sheet material do not extend all of the way down to the body portion 123. Rather, they terminate at the junction between the flanges and body portion, and this terminal edge of the sheet material helps evenly distribute the force axially along the band at this junction as the fastener is tightened. Also, the outer leg portion 150 on the nut side acts as a sacrificial layer that protects the load bearing inner leg portion 154.

Figure 4:
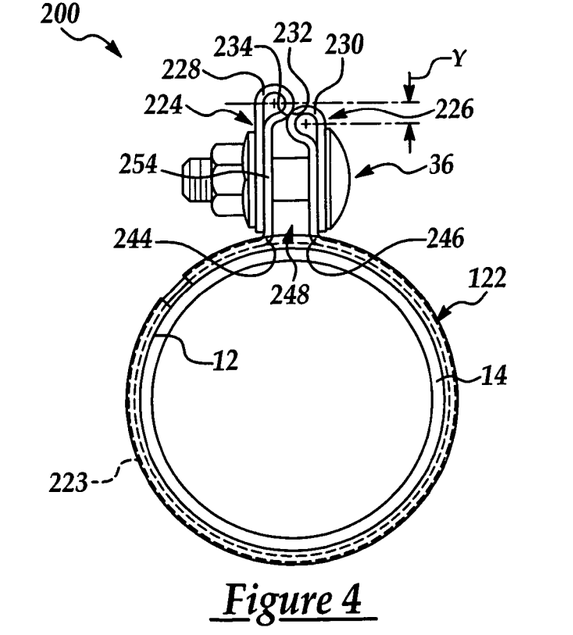
FIG. 4 is a side view of a third embodiment of a pipe coupler of the present invention showing opposing flanges offset in height from one another.

A third embodiment of the invention is shown in FIG. 4, wherein a coupler 200 has similar construction and function as the coupler 100 of the second embodiment shown in FIG.

3, except for a predetermined difference in flange height represented by dimension Y. Here, the sheet material of flanges 224, 226 are wrapped in the same direction as that of the second embodiment to form radially offset and opposing loops 228, 230. It is contemplated, however, that the wrap direction could be the same as that described above in reference to the first embodiment.

As before, the coupler 200 comprises the split sealing sleeve 12 that encircles the axially aligned pipes (only pipe 14 shown) at their respective ends. Disposed outside of the split sealing sleeve 12 is an open band 222, which is formed as a cylindrical body 223 and which terminates in the opposing flanges 224, 226. The coupler 200 can have the identical construction as coupler 100 of FIG. 3, with the exception of the offset in radial height of the two flanges 224, 226.

More specifically, in this embodiment one flange 224 is formed radially longer than the other flange 226 such that there is a difference in a radial dimension therebetween as depicted by Y. Preferably, the difference is roughly equivalent, in size or dimension, to the outside radius of the loops 228, 230. Accordingly, the loops 228, 230 are radially offset and, as the band 222 is tightened by the fastener 36, a bottom portion of an abutment surface 232 of one loop 228 contacts a top portion of an abutment surface 234 of another loop 230. Further tightening of the fastener 36 causes the loops 228, 230 to compress and either slide or roll against one another until the lower loop 230 contacts the inner leg portion 254 of the opposing flange 224. The lower loop 230 thus ultimately is nested underneath the upper loop 228 where that upper loop meets the inner leg 254.

This third embodiment permits further closing of a band gap 248, which defines the approximate circumferential distance that the ends 244, 246 can travel toward one another. In other words, the third embodiment enables the band 222 to be tightened up to the point where the ends 244, 246 can be brought closer together.

Figure 5:
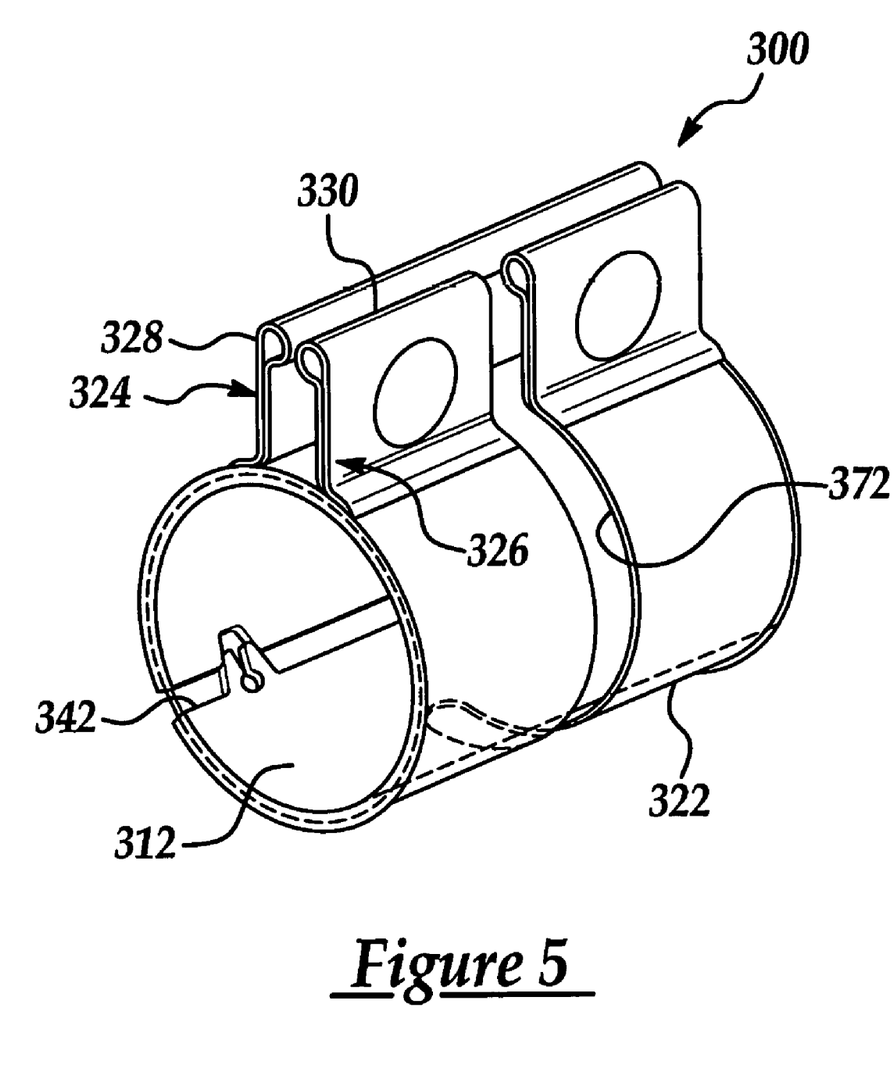
FIG. 5 is a perspective view of a fourth embodiment of a pipe coupler of the present invention which is similar to that of FIG. 1 with the primary difference being that the slot in the one flange extends for a longer distance around the circumference of the coupler.

Turning now to FIG. 5, there is shown a fourth embodiment 300 which is similar to the first embodiment of FIG. 1, except that the slot 372 that separates the flange 326 into two flange portions extends significantly further around the body portion of the band 322 than does the slot 72 of the first embodiment. This increased circumferential distance of the slot permits and even greater degree of independent tightening of the two halves of the band 322. This permits the coupler 300 to achieve improved sealing in circumstances in which there is some difference in outer diameters between the two pipes being joined. Such differences may occur even in pipes having the same nominal dimensions due to manufacturing tolerances. In all cases the slot extends at least partially about the circumference of the body portion of the band, and preferably does not extend so far as to overlie the gap 342 that extends between the mating ends of the inner split sleeve 312. For this purpose, the sleeve 312 is oriented within the band 322 so that the gap 342 is located between the slot 372 and the open ends of the band at the flanges 324, 326. In some embodiments the slot extends only a short distance around the body portion, as in the FIG. 1 embodiment, and in other cases, such as shown in FIG. 5, the slot can extend much farther. Preferably, where a longer slot is used, it extends for an angular distance of between 45° and 270°, even more preferably it extends about half of the circumference of the body portion of the band (for example, 180°). The slot preferably terminates at a radiused end as shown to help minimize point stresses and tearing of the band. The width of the slot is not critical and can be greater or lesser than is shown.

As will be appreciated by those skilled in the art, all of the above-described embodiments provide a pipe clamp that seals a sealing sleeve around exhaust pipes 14, 16 without the need for a separate reaction member and/or spacer bar that are common in many prior art mechanisms.

It is to be understood that the foregoing description is not a description of the invention itself, but of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above or where the statement specifically refers to "the invention." Various other embodiments and various changes and modifications to the disclosed embodiment(s) will become apparent to those skilled in the art. All such other embodiments, changes, and modifications are intended to come within the scope of the appended claims.

As used in this specification and appended claims, the terms "for example" and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A pipe clamp, comprising:
    a band of metal having first and second ends and being formed into a substantially cylindrical body portion;
    a pair of opposed flanges formed from sheet material at said ends of said band, wherein each of said opposed flanges extends radially from said body portion to a closed loop formed by a portion of said sheet material folded back onto itself such that said flanges comprise a plurality of layers of said sheet material, with said flanges each having an aperture through said sheet material at a location intermediate said loop and said body portion, and wherein said loops are disposed adjacent each other such that said flanges are separated by a gap that is greater at said apertures than at said loops; and
    a tightening mechanism that includes a fastener extending through said apertures in said opposed flanges for drawing the ends of said band together such that said band can be tightened about a pipe, whereby tightening of said band causes said loops of said flanges to engage each other, with further tightening causing a lower portion of said flanges at said body portion to be drawn together for further tightening of said band.

2. A pipe clamp as defined in claim 1, wherein said body portion of said band is made from said sheet material such that said flanges comprise unitary extensions of said body portion.

3. A pipe clamp as defined in claim 2, wherein said sheet material of each of said flanges is folded outwardly away from said gap and terminates at a junction between said flange and said body portion such that an end edge of said sheet material engages said junction during tightening of said fastener to thereby help evenly distribute the tightening force across the axial length of said band.

4. A pipe clamp as defined in claim 2, wherein said sheet material of each of said flanges is folded inwardly toward said gap and terminates at a location underlying a circumferential portion of said band.

5. A pipe clamp as defined in claim 1, wherein at least one of said layers of said flanges is substantially flat.

6. A pipe clamp as defined in claim 1, wherein said layers of at least a first one of said flanges are in contact with each other to thereby define an interface between said layers, and wherein a central region of said loop at said first flange is circumferentially offset from said interface in a direction toward the other of said loops.

7. A pipe clamp as defined in claim 1, wherein at least one of said opposed flanges is separated into two sections by a slot that extends into said body portion, with each of said sections including an aperture for receiving a fastener so that each of said sections can be tightened independently of the other section.

8. A pipe clamp as defined in claim 1, wherein one of said opposed flange portions is radially longer than the other of said opposed flange portions such that the loop of said one of said opposed flange portions is radially offset with respect to the loop of said other of said opposed flange portions.

9. A pipe clamp for use in joining tubular members, said pipe clamp comprising:

a band comprising a cylindrical body portion adapted to fit around said tubular members, said band terminating at opposed linear flanges wherein each of said opposed flanges includes an inner leg portion, an outer leg portion, and a loop which are all formed from a unitary piece of sheet material, said inner and outer leg portions of each flange being in contact with each other to thereby define an interface between said leg portions, said flanges each including an aperture extending through said interface, and wherein each of said loops include a central region that is circumferentially offset from its associated interface in a direction toward the other of said loops; and at least one tightening mechanism including a fastener inserted through said apertures in said flanges for tightening said band around the tubular members.

10. A pipe clamp as defined in claim 9, wherein said loops are formed by wrapping said sheet material in a wrap direction outwardly with respect to the inner leg portion of said flange to form the outer leg portion and terminating said sheet material radially outwardly of said cylindrical body portion of said band to form the outer leg portion.

11. A pipe clamp as defined in claim 9, wherein said loops are formed by wrapping said sheet material inwardly with respect to the outer leg portion of said flange to form the inner leg portion, said sheet material extending along said outer leg portion and partially underlying said cylindrical body portion of said band.

12. A pipe clamp as defined in claim 9, wherein said loops include abutment surfaces that contact each other upon tightening of said band.

13. A pipe clamp as defined in claim 9, wherein said inner and outer leg portions extend radially from said cylindrical body portion of said band to said loops with said leg portions being in contact with each other throughout their radial extent.

14. A pipe clamp as defined in claim 9, wherein said loops are positioned radially outward of said cylindrical body portion.

15. A pipe clamp as defined in claim 9, comprising a slot formed into one of said flanges and extending into a portion of said cylindrical body portion.

16. A pipe clamp as defined in claim 9, wherein said pipe clamp is a band clamp.

17. A pipe clamp as defined in claim 9, wherein said pipe clamp is a pipe coupler and includes a tubular sleeve within said body portion.

18. A pipe clamp as defined in claim 9, wherein one of said opposed flanges is radially longer than the other of said opposed flanges such that the loop of said one of said opposed flanges is radially offset with respect to the loop of said other of said opposed flanges.

19. A pipe clamp, comprising:

a band of metal having first and second ends and being formed into a substantially cylindrical body portion;

a pair of opposed flanges formed from sheet material at said ends of said band, wherein each of said opposed linear flanges extends radially from said body portion to a closed loop formed by a portion of said sheet material folded back onto itself such that said flanges comprise a plurality of layers of said sheet material, with said flanges each having an aperture through said sheet material at a location intermediate said loop and said body portion, and wherein said layers of at least one of said flanges includes an inner layer and an outer layer, wherein said outer layer extends radially farther than said inner layer to thereby form a portion of said loop; and a tightening mechanism that includes a fastener extending through said apertures in said opposed flanges for drawing the ends of said band together.

20. A pipe clamp, comprising:

a band of metal having first and second ends and being formed into a substantially cylindrical body portion;

first and second flanges formed from sheet material, each flange being located adjacent the other flange at one of said ends of said band, wherein each of said flanges extends radially from said body portion to a loop formed by a portion of said sheet material folded back onto itself such that said flanges comprise a plurality of layers of said sheet material, with said layers of each flange extending radially from said body portion to said loop, said layers of each flange being in direct contact with each other along at least a portion of their radial extent, wherein said first flange is radially longer than said second flange such that said loop of said first flange is located radially farther away from said body portion than said loop of said second flange; and a tightening mechanism that includes a fastener extending through said apertures in said flanges.

21. A pipe coupler, comprising:

a band of metal having a substantially cylindrical body portion that extends from a first end to a second end, said band including radially-extending opposed flanges at said ends, each said flange being formed as a unitary extension of said body portion and being disposed opposite the other flange, wherein at least a first one of said flanges includes a slot that separates said flange into two flange portions and that extends into said body portion at a central region of said body portion and partially about the circumference of said band;

a tightening mechanism that includes at least two fasteners, each fastener being connected to said flanges for drawing one of said flange portions of said first flange toward the other flange to enable tightening of each flange portion substantially independently of the tightening of the other flange portion; and a split sleeve located within said band, said sleeve extending circumferentially within said band from a first mating end to a second mating end, wherein said mating ends are separated by a gap that can be at least partially closed during tightening of said band, said mating ends being rotational oriented within said band such that said slot radially overlies said sleeve but does not overlie said gap.

22. A pipe coupler as defined in claim 21, wherein:

said opposed flanges and body portion of said band are formed from sheet material at said ends of said band, each of said opposed flanges extends radially from said body portion to a loop formed by a portion of said sheet material folded back onto itself such that said flanges comprise a plurality of layers of said sheet material, with said flanges each having an aperture through said sheet material at a location intermediate said loop and said body portion, and wherein said loops are disposed adjacent each other such that said flanges are separated by a gap that is greater at said apertures than at said loops; and said tightening mechanism includes one of said fasteners extending through each of said apertures in said opposed flanges for drawing the ends of said band together, whereby tightening of said band causes said loops of said flanges to engage each other, with further tightening causing a lower portion of said flanges at said body portion to be drawn together for further tightening of said band.

23. A pipe coupler as defined in claim 21, wherein said slot extends about said band for an angular distance of between 45° and 270°.

24. A pipe coupler as defined in claim 23, wherein said slot extends about half of the circumference of said band.

* * * * *